(12) United States Patent
Song et al.

(10) Patent No.: US 12,100,831 B2
(45) Date of Patent: Sep. 24, 2024

(54) LITHIUM SECONDARY BATTERY

(71) Applicant: LG ENERGY SOLUTION, LTD., Seoul (KR)

(72) Inventors: Myeongjun Song, Daejeon (KR); Myeongseong Kim, Daejeon (KR); Minsu Kim, Daejeon (KR); Intae Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 736 days.

(21) Appl. No.: 17/285,417

(22) PCT Filed: May 28, 2020

(86) PCT No.: PCT/KR2020/006907
§ 371 (c)(1),
(2) Date: Apr. 14, 2021

(87) PCT Pub. No.: WO2020/242219
PCT Pub. Date: Dec. 3, 2020

(65) Prior Publication Data
US 2021/0408526 A1 Dec. 30, 2021

(30) Foreign Application Priority Data

May 28, 2019 (KR) .......................... 10-2019-0062459
May 31, 2019 (KR) .......................... 10-2019-0064307
May 28, 2020 (KR) .......................... 10-2020-0063973

(51) Int. Cl.
*H01M 4/00* (2006.01)
*H01M 4/133* (2010.01)
(Continued)

(52) U.S. Cl.
CPC ........... *H01M 4/362* (2013.01); *H01M 4/133* (2013.01); *H01M 4/5815* (2013.01);
(Continued)

(58) Field of Classification Search
CPC ........ H01M 4/38; H01M 4/362; H01M 4/625; H01M 10/0525; H01M 2004/021;
(Continued)

(56) References Cited

U.S. PATENT DOCUMENTS 6,194,099 B1 *  2/2001  Gernov ................. H01M 4/625
                                                           29/623.5
2004/0009393 A1   1/2004  Kim et al.
(Continued)

FOREIGN PATENT DOCUMENTS

CN          1487620 A         4/2004
CN        103459312 A        12/2013
(Continued)

OTHER PUBLICATIONS

Machine translation of CN 107068944, obtained Jan. 2024 (Year: 2017).*
(Continued)

*Primary Examiner* — Nicholas P D'Aniello
(74) *Attorney, Agent, or Firm* — Birch, Stewart, Kolasch & Birch, LLP

(57) ABSTRACT

Disclosed is a lithium secondary battery, and in particular, to a lithium secondary battery capable of obtaining higher energy density and longer lifetime compared to existing lithium secondary batteries by specifying conditions of a positive electrode and an electrolyte liquid and additionally surface modifying a carbon material through heat treatment or including a separator including a molybdenum disulfide coating layer.

12 Claims, 4 Drawing Sheets

Comparative Preparation Example 1

Preparation Example 1

(51) Int. Cl.
*H01M 4/36* (2006.01)
*H01M 4/58* (2010.01)
*H01M 10/0525* (2010.01)
*H01M 10/0569* (2010.01)
*H01M 50/417* (2021.01)
*H01M 50/431* (2021.01)
*H01M 50/451* (2021.01)
*H01M 4/02* (2006.01)

(52) U.S. Cl.
CPC ... *H01M 10/0525* (2013.01); *H01M 10/0569* (2013.01); *H01M 50/417* (2021.01); *H01M 50/431* (2021.01); *H01M 50/451* (2021.01); *H01M 2004/021* (2013.01); *H01M 2004/028* (2013.01); *H01M 2300/0034* (2013.01)

(58) Field of Classification Search
CPC ....... H01M 2004/028; H01M 2220/20; H01M 2300/0037; H01M 2300/0034; H01M 4/13; H01M 4/139; H01M 4/382; H01M 10/0569; H01M 10/052; Y02E 60/10
See application file for complete search history.

(56) References Cited

U.S. PATENT DOCUMENTS

| | | |
|---|---|---|
| 2013/0040185 A1 | 2/2013 | Takase |
| 2013/0266847 A1 | 10/2013 | Noguchi et al. |
| 2013/0280600 A1 | 10/2013 | Uehara et al. |
| 2013/0337347 A1* | 12/2013 | Pol ................ H01M 4/583 568/18 |
| 2014/0287306 A1 | 9/2014 | Takeshi et al. |
| 2014/0322618 A1 | 10/2014 | Braun |
| 2016/0248087 A1* | 8/2016 | Kim ................ H01M 4/625 |
| 2018/0062206 A1 | 3/2018 | Yang et al. |
| 2018/0159121 A1 | 6/2018 | Guo et al. |
| 2018/0248227 A1 | 8/2018 | Park et al. |
| 2018/0301739 A1 | 10/2018 | Park et al. |
| 2018/0331352 A1 | 11/2018 | Morales Palomino et al. |
| 2019/0123377 A1 | 4/2019 | Yang et al. |
| 2021/0399294 A1 | 12/2021 | Cho et al. |

FOREIGN PATENT DOCUMENTS

| | | |
|---|---|---|
| CN | 103500819 A | 1/2014 |
| CN | 107068944 A | 8/2017 |
| CN | 107359303 A | 11/2017 |
| CN | 113039670 A | 6/2021 |
| EP | 3 480 881 A1 | 5/2019 |
| EP | 3 863 089 A1 | 8/2021 |
| JP | 2015-505825 A | 2/2015 |
| JP | 2017-178859 A | 10/2017 |
| JP | 2019-513873 A | 5/2019 |
| KR | 10-0354229 B1 | 9/2002 |
| KR | 10-2013-0018511 A | 2/2013 |
| KR | 10-2014-0019062 A | 2/2014 |
| KR | 10-1379716 B1 | 3/2014 |
| KR | 10-1457319 B1 | 11/2014 |
| KR | 10-2015-0044833 A | 4/2015 |
| KR | 10-2015-0078434 A | 7/2015 |
| KR | 10-2015-0088913 A | 8/2015 |
| KR | 10-2016-0031291 A | 3/2016 |
| KR | 10-2016-0037084 A | 4/2016 |
| KR | 10-2017-0001374 A | 1/2017 |
| KR | 10-2017-0092455 A | 8/2017 |
| KR | 10-1764455 B1 | 8/2017 |
| KR | 10-2017-0121047 A | 11/2017 |
| KR | 10-1806593 B1 | 12/2017 |
| KR | 10-2018-0042157 A | 4/2018 |
| KR | 10-2018-0084862 A | 7/2018 |
| KR | 10-2018-0102406 A | 9/2018 |
| KR | 10-2018-0116927 A | 10/2018 |
| KR | 10-2019-0056484 A | 5/2019 |
| WO | WO 2012/131628 A1 | 10/2012 |
| WO | WO 2018/007665 A1 | 1/2018 |

OTHER PUBLICATIONS

Cuisinier et al., "Unique behaviour of nonson for polysulphides in lithium-sulphur batteries", Energy & Environmental Science, vol. 7, No. 8, Jan. 1, 2014, pp. 2697-2705.

Extended European Search Report for European Application No. 20815096.1, dated Dec. 15, 2021.

Fotouhi et al., "Lithium-Sulfur Battery Technology Readiness and Applications—A Review", Energies 2017, 10(12), 1937, total 15 pages.

International Search Report for PCT/KR2020/006907 mailed on Sep. 10, 2020.

Yang et al., "Structural Design of Lithium-Sulfur Batteries: From Fundamental Research to Practical Application", Electrochemical Energy Reviews (2018), vol. 1, pp. 239-293.

* cited by examiner

[Figure 1]
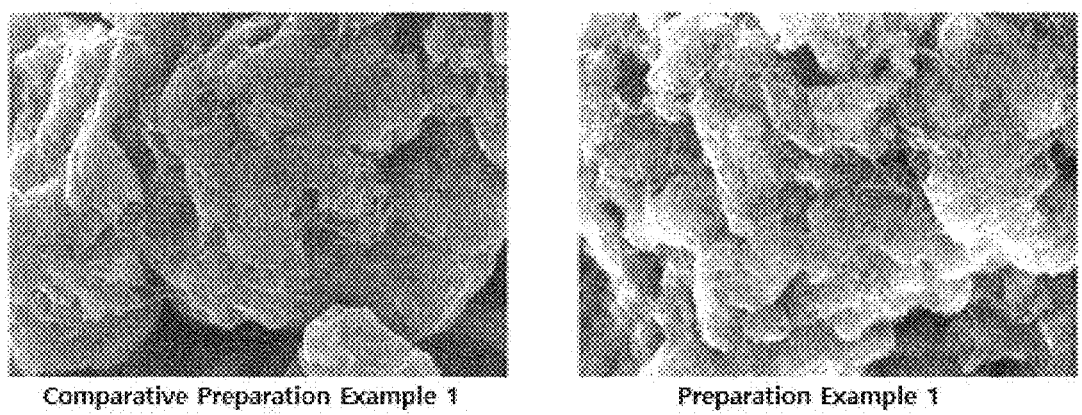
[Figure 2]
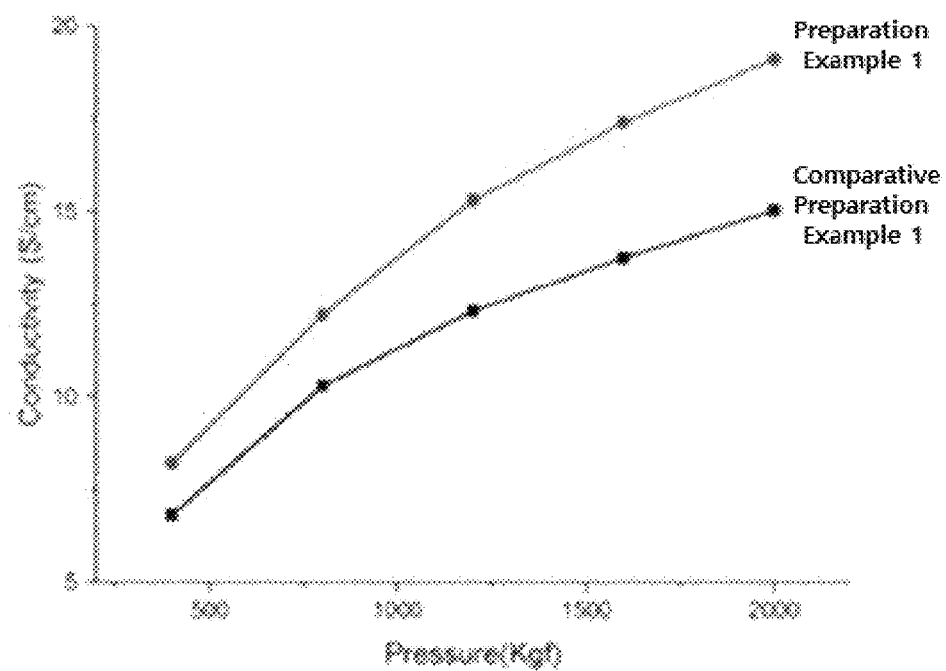

[Figure 3]
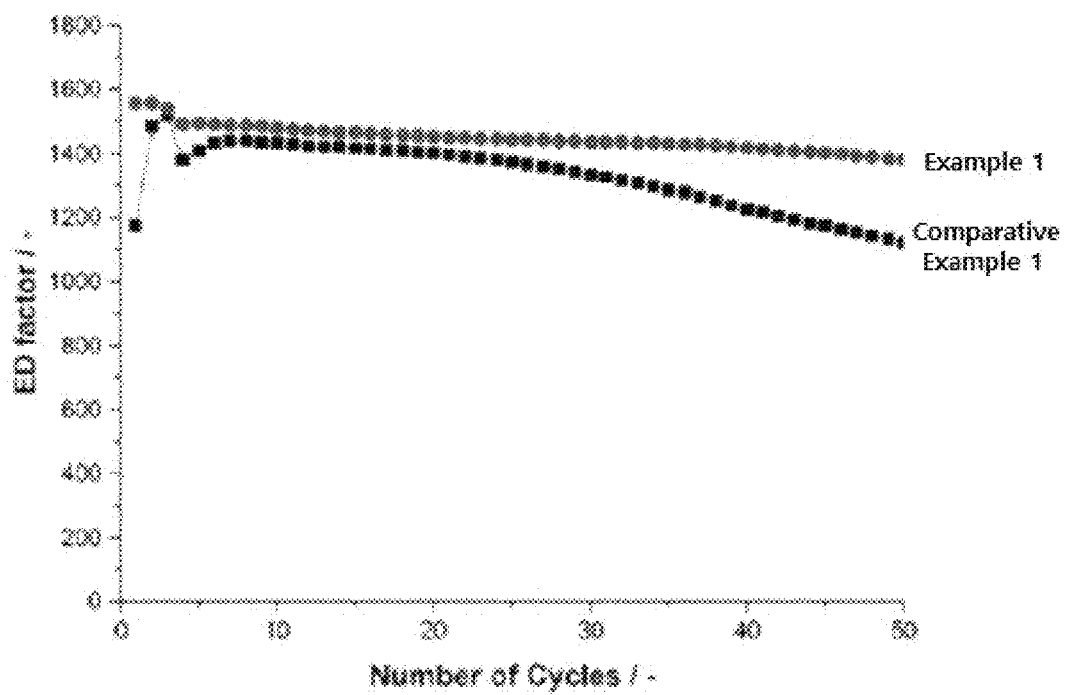

[Figure 4]
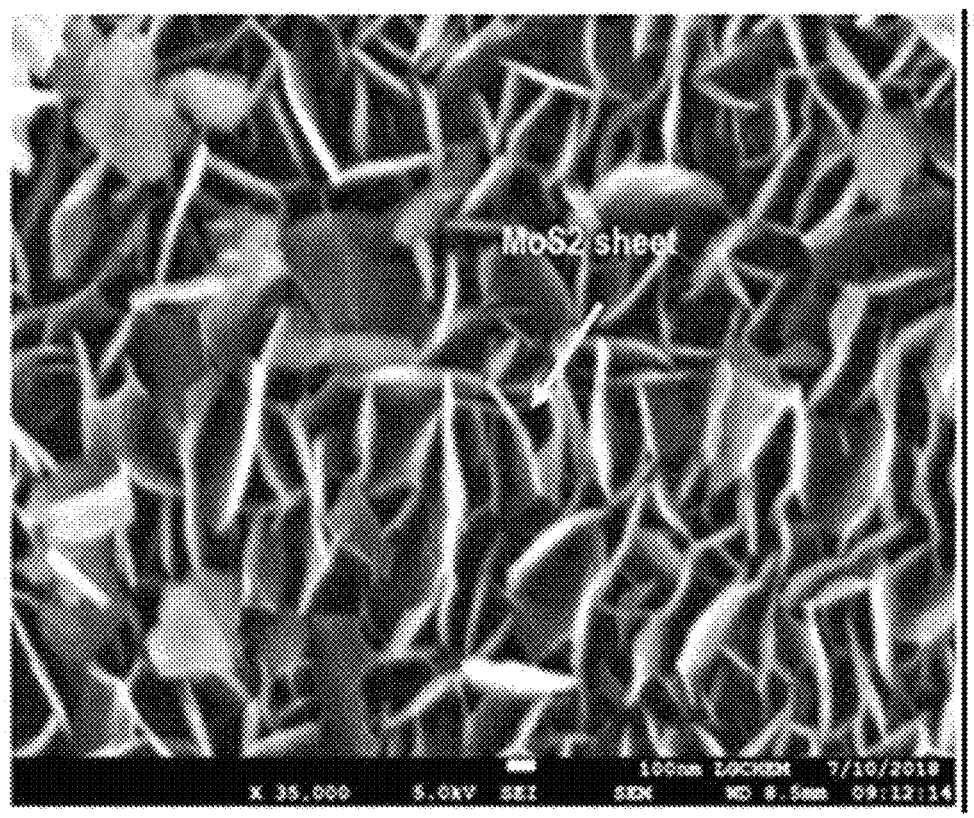

【Figure 5】
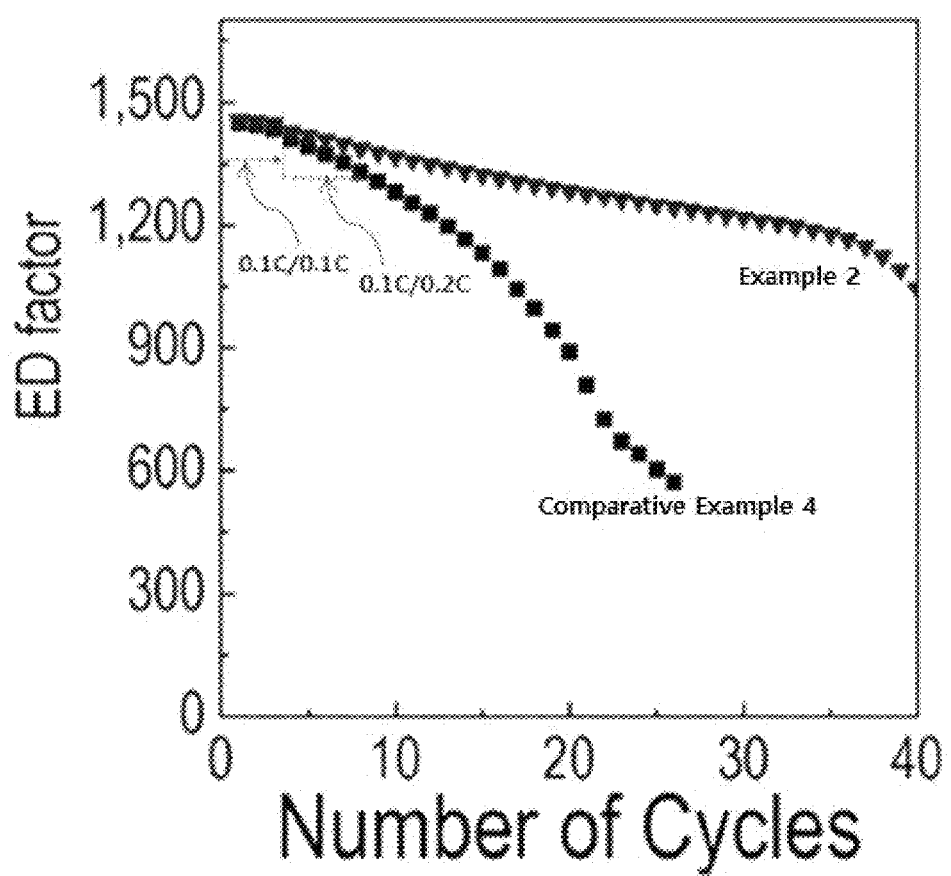

LITHIUM SECONDARY BATTERY

TECHNICAL FIELD

This application claims the benefits of priorities based on Korean Patent Application No. 10-2019-0062459 filed on May 28, 2019, Korean Patent Application No. 10-2019-0064307 filed on May 31, 2019, and Korean Patent Application No. 10-2020-0063973 filed on May 28, 2020, the entire contents of which are incorporated herein by reference.

One aspect of the present disclosure relates to a lithium secondary battery.

BACKGROUND ART

As application areas of secondary batteries expand to electric vehicles (EV), energy storage systems (ESS) or the like, lithium-ion secondary batteries having relatively low weight to energy storage density (~250 Wh/kg) have limits in applications for such products. On the other hand, a lithium-sulfur secondary battery is capable of accomplishing high weight to energy storage density (~2,600 Wh/kg) theoretically, and thereby has received attention as a next generation secondary battery technology.

A lithium-sulfur secondary battery is a battery system using a sulfur series material having a sulfur-sulfur bond as a positive electrode active material, and lithium metal as a negative electrode active material. Such a lithium-sulfur secondary battery has advantages in that sulfur, a main material of the positive electrode active material, is very abundant in resources globally, has no toxicity and has a low atomic weight.

During discharge of a lithium-sulfur secondary battery, lithium, a negative electrode active material, is oxidized while releasing electrons and being ionized, and a sulfur series material, a positive electrode active material, is reduced by receiving the electrons. Herein, the oxidation reaction of lithium is a process in which lithium metal releases electrons and changes into a lithium cation form. In addition, the reduction reaction of sulfur is a process in which a sulfur-sulfur bond receives two electrons and changes into a sulfur anion form. The lithium cation produced through the oxidation reaction of lithium is transferred to a positive electrode through an electrolyte, and forms a salt by bonding with the sulfur anion produced through the reduction reaction of sulfur. Specifically, sulfur before discharge has a cyclic $S_8$ structure, and this changes to lithium polysulfide ($Li_2S_x$, x=8, 6, 4, 2) through the reduction reaction, and when such lithium polysulfide is fully reduced, lithium sulfide ($Li_2S$) is eventually produced.

Due to low electrical conductivity of sulfur, a positive electrode active material, reactivity with electrons and lithium ions is difficult to secure in a solid-state form. In order to improve such reactivity of sulfur, existing lithium-sulfur secondary batteries produce intermediate polysulfide in a $Li_2S_x$ form to induce a liquid-state reaction and improve reactivity. Herein, an ether-based solvent such as dioxolane or dimethoxyethane having high solubility for lithium polysulfide is used as a solvent of an electrolyte liquid. In addition, existing lithium-sulfur secondary batteries build a catholyte-type lithium-sulfur secondary battery system to improve reactivity, and in this case, sulfur reactivity and lifetime properties are affected by the electrolyte liquid content due to properties of lithium polysulfide readily dissolved in the electrolyte liquid. In addition, a low content electrolyte liquid needs to be injected in order to build high energy density, however, a lithium polysulfide concentration increases in the electrolyte liquid as the electrolyte liquid decreases making normal battery driving difficult due to a decrease in the active material mobility and an increase in the side reaction.

Such lithium polysulfide elution adversely affects battery capacity and lifetime properties, and various technologies for suppressing lithium polysulfide elution have been proposed.

As one example, Korean Laid-Open Patent Publication No. 2016-0037084 discloses that using a carbon nanotube aggregate having a three-dimensional structure coated with graphene as a carbon material may prevent lithium polysulfide from eluting, and enhance conductivity of a sulfur-carbon nanotube composite.

In addition, Korean Patent No. 1379716 discloses that, by using a sulfur-including graphene composite, which is prepared through a method of treating graphene with hydrofluoric acid to form a pore on the graphene surface, and growing sulfur particles in the pore, as a positive electrode active material, lithium polysulfide elution is suppressed and as a result, a decrease in the battery capacity may be minimized.

In addition, Korean Laid-Open Patent Publication No. 2018-0116927 and Korean Laid-Open Patent Publication No. 2015-0044833 disclose that battery performance may be improved by using a sulfur-carbon composite including various forms of carbon materials in a lithium-sulfur secondary battery.

By varying structures or materials of a sulfur-carbon composite used as a positive electrode active material, these patents have somewhat improved a problem of performance decline in a lithium-sulfur secondary battery through preventing lithium polysulfide elution, however, the effects are not sufficient. Accordingly, in order to build a lithium-sulfur secondary battery with high energy density, a battery system capable of driving a high loading and low porosity electrode is required, and studies on such a battery system have been continuously conducted in the art.

PRIOR ART DOCUMENTS

Patent Documents (Patent Document 1) Korean Patent Application Laid-Open Publication No. 2016-0037084
(Patent Document 2) Korean Patent No. 1379716
(Patent Document 3) Korean Patent Application Laid-Open Publication No. 2018-0116927
(Patent Document 4) Korean Patent Application Laid-Open Publication No. 2015-0044833

Non-Patent Documents (Non-Patent Document 1) Abbas Fotouhi et al., Lithium-Sulfur Battery Technology Readiness and Applications—A Review, Energies 2017, 10, 1937

DISCLOSURE

Technical Problem

As a result of extensive studies in view of the above, the inventors of one aspect of the present disclosure have identified that a lithium-sulfur secondary battery having high energy density and long lifetime is obtained when adjusting a positive electrode and an electrolyte liquid to be under specific conditions, and have completed one aspect of the present disclosure. In addition, the inventors of one aspect of the present disclosure have identified that a lithium-sulfur secondary battery having high energy density and long lifetime is obtained when either including a carbon material of which surface is modified by heat treatment in a positive electrode active material, or forming a molybdenum disulfide coating layer in a separator.

Accordingly, an aspect of one aspect of the present disclosure provides a lithium secondary battery having excellent energy density and lifetime properties.

Technical Solution

According to an aspect of one aspect of the present disclosure, there is provided a lithium secondary battery including a positive electrode, a negative electrode, a separator and an electrolyte liquid,
wherein the positive electrode has an SC factor value represented by the following Mathematical Formula 1 of 0.45 or greater:

$$SC \text{ factor} = \alpha \times \frac{L}{P} \quad \text{[Mathematical Formula 1]}$$

(in Mathematical Formula 1,
P is porosity (%) of a positive electrode active material layer in the positive electrode,
L is a mass of sulfur per unit area (mg/cm$^2$) of the positive electrode active material layer in the positive electrode, and
α is 10 (constant)),
the electrolyte liquid includes a solvent and a lithium salt, and
the solvent includes a first solvent having a DV$^2$ factor value represented by the following Mathematical Formula 2 of 1.75 or less; and a second solvent that is a fluorinated ether-based solvent:

$$DV^2 \text{ factor} = \gamma \times \frac{\mu}{DV} \quad \text{[Mathematical Formula 2]}$$

(in Mathematical Formula 2,
DV is a dipole moment per unit volume (D·mol/L),
μ is viscosity of the solvent (cP, 25° C.), and
γ is 100 (constant)).

The positive electrode includes a sulfur-carbon composite containing a surface-modified carbon material, and a content of carbon included in the carbon material may be 98% by weight or greater.

The carbon material may have a specific surface area of 280 m$^2$/g to 4500 m$^2$/g and a pore volume of 2.3 cm$^3$/g to 5 cm$^3$/g.

The sulfur-carbon composite may have a specific surface area of 10 m$^2$/g to 20 m$^2$/g and a pore volume of 0.04 cm$^3$/g to 1 cm$^3$/g.

The separator may include a porous substrate, and a molybdenum disulfide coating layer formed on at least one surface of the porous substrate.

The molybdenum disulfide coating layer may have a thickness of 0.1 μm to 10 μm.

The molybdenum disulfide coating layer is formed on one surface of the porous substrate, and the molybdenum disulfide coating layer may be disposed facing the negative electrode.

The first solvent may have a DV$^2$ factor value of 1.5 or less.

The lithium secondary battery may have an NS factor value represented by the following Mathematical Formula 3 of 3.5 or less:

$$NS \text{ factor} = \frac{DV^2 \text{ factor}}{SC \text{ factor}} \quad \text{[Mathematical Formula 3]}$$

(in Mathematical Formula 3,
the SC factor has the same value as defined in Mathematical Formula 1, and
the DV$^2$ factor has the same value as defined in Mathematical Formula 2).

The lithium secondary battery may have an ED factor value represented by the following Mathematical Formula 4 of 850 or greater:

$$ED \text{ factor} = V \times SC \text{ factor} \times \frac{C}{D} \quad \text{[Mathematical Formula 4]}$$

(in Mathematical Formula 4,
V is a discharge nominal voltage (V) for Li/Li$^+$,
SC factor has the same value as defined in Mathematical Formula 1,
C is discharge capacity (mAh/g) when discharging at a 0.1 C rate, and
D is density (g/cm$^3$) of the electrolyte liquid).

The first solvent may include one or more types selected from the group consisting of propionitrile, dimethylacetamide, dimethylformamide, gamma-butyrolactone, triethylamine and 1-iodopropane.

The second solvent may include one or more types selected from the group consisting of 1H,1H,2'H,3H-decafluorodipropyl ether, difluoromethyl 2,2,2-trifluoroethyl ether, 1,2,2,2-tetrafluoroethyl trifluoromethyl ether, 1,1,2,3,3,3-hexafluoropropyl difluoromethyl ether, pentafluoroethyl 2,2,2-trifluoroethyl ether and 1H,1H,2'H-perfluorodipropyl ether.

The solvent may include the first solvent in 1% by weight to 50% by weight based on a total weight of the solvent.

The solvent may include the second solvent in 50% by weight to 99% by weight based on a total weight of the solvent.

The solvent may include the first solvent and the second solvent in a weight ratio of 3:7 to 1:9.

Advantageous Effects

By adjusting a positive electrode and an electrolyte liquid to be under specific conditions, a lithium secondary battery according to one embodiment of the present invention is capable of improving performance and lifetime properties of the lithium secondary battery.

In addition, a lithium secondary battery according to another embodiment of the present invention is capable of enhancing lifetime properties of the lithium secondary battery by, while adjusting a positive electrode and an electrolyte liquid to be under specific conditions, uniformly supporting sulfur by using a carbon material of which surface is modified by heat treatment as a carbon material included in a positive electrode active material.

Furthermore, a lithium secondary battery according to still another embodiment of the present invention is capable of exhibiting high energy density and long lifetime properties that have been difficult to obtain with existing lithium secondary batteries by, while adjusting a positive electrode and an electrolyte liquid to be under specific conditions, being provided with a separator including a molybdenum disulfide coating layer.

DESCRIPTION OF DRAWINGS

FIG. 1 shows scanning electron microscope (SEM) images of a sulfur-carbon composite including surface-modified CNT (heat treated group) and a sulfur-carbon composite including CNT (untreated group) respectively prepared in Preparation Example 1 and Comparative Preparation Example 1.

FIG. 2 shows a powder resistance measurement graph of a sulfur-carbon composite including surface-modified CNT (heat treated group) and a sulfur-carbon composite including CNT (untreated group) respectively prepared in Preparation Example 1 and Comparative Preparation Example 1.

FIG. 3 shows a graph presenting ED factor values depending on the number of cycles of lithium-sulfur secondary batteries each manufactured in Example 1 and Comparative Example 1.

FIG. 4 shows a scanning electron microscope (SEM) image of a separator according to Preparation Example 2 of the present invention.

FIG. 5 shows graphs presenting performance evaluation results of batteries of an example and a comparative example according to Experimental Example 4 of the present invention.

BEST MODE

Hereinafter, the present invention will be described in more detail.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

Terms used in the present invention are for describing specific embodiments only and do not intend to limit the present inventive. Singular forms used herein include plural forms as well, unless the context clearly indicates otherwise. In the present invention, terms such as 'include' or 'have' are to specify the presence of features, numbers, steps, behaviors, constituents, components or combinations thereof described in the specification, and need to be construed as not excluding the possibility of presence or addition of one or more other features, numbers, steps, behaviors, constituents, components or combinations thereof in advance.

The term "polysulfide" used in the present specification is a concept including both "polysulfide ion ($S_x^{2-}$, x=8, 6, 4, 2))" and "lithium polysulfide ($Li_2S_x$ or $LiS_x^-$, x=8, 6, 4, 2)".

One embodiment of the present invention provides a lithium secondary battery including a positive electrode, a negative electrode, and a separator and an electrolyte liquid provided therebetween. Specifically, the lithium secondary battery may be a lithium-sulfur secondary battery including sulfur as a positive electrode active material.

A lithium-sulfur secondary battery has high discharge capacity and energy density among various lithium secondary batteries, and has received attention as a next-generation secondary battery with an advantage of sulfur used as a positive electrode active material being abundant in resources and low-priced lowering manufacturing costs of the battery, and being environmental-friendly.

However, in existing lithium-sulfur secondary battery systems, the lithium polysulfide elution described above is not suppressed causing sulfur loss, and as a result, theoretical discharge capacity and theoretical energy density are not fully obtained in actual driving since the amount of sulfur participating in an electrochemical reaction rapidly decreases. Particularly, as well as being floated or precipitated in an electrolyte liquid, the lithium polysulfide eluted as above directly reacts with lithium metal, a negative electrode, and is fixed on a negative electrode surface in a $Li_2S$ form causing a problem of corroding a lithium metal negative electrode and rapidly declining initial capacity and cycle properties after a certain cycle.

In existing technologies, methods such as introducing a material capable of suppressing lithium polysulfide elution to a positive electrode or a separator in an additive or protective layer form, changing a structure or material of a positive electrode active material, changing a composition of an electrolyte, and the like, have been proposed, however, an effect of improving lithium polysulfide elution has been insignificant, and there are also disadvantages of having a limitation in the amount of sulfur, a positive electrode active material, to introduce (that is, loading amount), and causing a serious problem in battery stability or being inefficient in terms of process.

In view of the above, a lithium secondary battery according to one embodiment of the present invention including a positive electrode, a negative electrode, a separator and an electrolyte liquid is capable of improving battery performance and lifetime properties by having low positive electrode active material layer porosity, including a positive electrode having a high loading amount of sulfur that is a positive electrode active material, and adjusting a solvent included in the electrolyte liquid to satisfy a certain condition.

In addition, a lithium secondary battery according to another embodiment of the present invention is capable of improving battery performance and lifetime properties by, in addition to the conditions of the positive electrode and the electrolyte liquid described above, surface modifying a carbon material included in a positive electrode active material through heat treatment.

In addition, a lithium secondary battery according to still another embodiment of the present invention is capable of enhancing energy density of the battery by, in addition to the conditions of the positive electrode and the electrolyte liquid described above, using a separator including a molybdenum disulfide coating layer on a porous substrate surface.

Lithium Secondary Battery (1)

A lithium secondary battery according to one embodiment of the present invention relates to a lithium secondary battery including a positive electrode, a negative electrode, a separator and an electrolyte liquid, wherein the positive electrode has an SC factor value represented by the following Mathematical Formula 1 of 0.45 or greater:

$$SC\ factor = \alpha \times \frac{L}{P} \quad \text{[Mathematical Formula 1]}$$

(in Mathematical Formula 1,

P is porosity (%) of a positive electrode active material layer in the positive electrode, L is a mass of sulfur per unit area (mg/cm$^2$) of the positive electrode active material layer in the positive electrode, and α is 10 (constant)), the electrolyte liquid includes a solvent and a lithium salt, and the solvent includes a first solvent having a DV$^2$ factor value represented by the following Mathematical Formula 2 of 1.75 or less; and a second solvent that is a fluorinated ether-based solvent:

$$DV^2 \text{ factor} = \gamma \times \frac{\mu}{DV} \qquad \text{[Mathematical Formula 2]}$$

(in Mathematical Formula 2,

DV is a dipole moment per unit volume (D·mol/L),

μ is viscosity of the solvent (cP, 25° C.), and

γ is 100 (constant)).

Positive Electrode

The positive electrode according to the present invention may include a positive electrode current collector, and a positive electrode active material layer coated on one surface or both surfaces of the positive electrode current collector.

The positive electrode current collector is not particularly limited as long as it supports a positive electrode active material, and has high conductivity without inducing chemical changes to the corresponding battery. For example, copper, stainless steel, aluminum, nickel, titanium, palladium, baked carbon, copper or stainless steel of which surface is treated with carbon, nickel, silver or the like, aluminum-cadmium alloys and the like may be used.

The positive electrode current collector may strengthen binding strength with the positive electrode active material by forming micro unevenness on a surface thereof, and various forms such as films, sheets, foil, meshes, nets, porous bodies, foams or non-woven fabrics may be used.

The thickness of the positive electrode current collector is not particularly limited, but may be, for example, from 3 μm to 500 μm.

The positive electrode active material layer may include a positive electrode active material, and selectively, a conductor and a binder.

The positive electrode active material includes a sulfur series compound. The sulfur series compound may include one or more types selected from the group consisting of inorganic sulfur ($S_8$), $Li_2S_n$ (n≥1), disulfide compounds such as 2,5-dimercapto-1,3,4-thiadiazole or 1,3,5-trithiocyanuic acid, organosulfur compounds and carbon-sulfur polymers (($C_2S_x)_n$, x=2.5 to 50, n≥12). Preferably, inorganic sulfur ($S_8$) may be used.

The sulfur series compound alone does not have electrical conductivity, and therefore, is composited with a carbon material, a conductive material. Preferably, the positive electrode active material may be a sulfur-carbon composite. Herein, the term "composite" means a material exhibiting, by combining two or more materials, more effective functions while forming physically and chemically different phases.

In the sulfur-carbon composite, the carbon material provides a skeleton capable of uniformly and stably fixing the sulfur-series compound described above, and allows an electrochemical reaction to smoothly progress by compensating low electrical conductivity of sulfur.

The carbon material may be generally prepared by carbonizing a precursor made of various carbon materials. The carbon material may include a number of pores that are not constant on the surface and the inside. The pores have an average diameter in a range of 1 nm to 200 nm, and the porosity may be in a range of 10% to 90% of the total carbon material volume. When the pores have an average diameter of less than the above-mentioned range, the pore size is merely a molecular level making sulfur impregnation impossible, and when the pores have an average diameter of greater than the above-mentioned range, the carbon material has weakened mechanical strength, which is not preferred to use in an electrode preparation process.

The form of the carbon material may be a globular type, a rod type, a needle type, a plate type, a tube type or a bulk type, and may be used without limit as long as it is commonly used in a lithium secondary battery.

The carbon material is not limited as long as it is, as a material having a porous structure or having a high specific surface area, commonly used in the art. For example, the porous carbon material may be one or more types selected from the group consisting of graphite; graphene; carbon black such as denka black, acetylene black, ketjen black, channel black, furnace black, lamp black or thermal black; carbon nanotubes (CNT) such as single-walled carbon nanotubes (SWCNT) or multi-walled carbon nanotubes (MWCNT); carbon fibers such as graphite nanofibers (GNF), carbon nanofibers (CNF) or activated carbon fibers (ACF); natural graphite, artificial graphite, expanded graphite and activated carbon, but is not limited thereto.

In the sulfur-carbon composite of the present invention, the sulfur-series compound may be included in 50% by weight to 90% by weight based on a total weight of the sulfur-carbon composite. For example, a content of the sulfur-series compound may be 50% by weight or greater, 55% by weight or greater, 60% by weight or greater or 65% by weight or greater, and may be 75% by weight or less, 80% by weight or less, 85% by weight or less or 90% by weight or less.

In the sulfur-carbon composite of the present invention, the carbon material may be included in 10% by weight to 50% by weight based on a total weight of the sulfur-carbon composite. For example, a content of the carbon material may be 10% by weight or greater, 15% by weight or greater, 20% by weight or greater or 25% by weight or greater, and may be 35% by weight or less, 40% by weight or less, 45% by weight or less or 50% by weight or less.

Accordingly, a weight ratio of the carbon material and the sulfur-series compound may be from 1:1 to 1:9 in the sulfur-carbon composite. For example, the weight ratio may be 1:1 or less, 1:1.5 or less or 1:2 or less, and may be 1:3 or greater, 1:4 or greater, 1:5 or greater, 1:6 or greater, 1:7 or greater, 1:8 or greater or 1:9 or greater.

When the content of the sulfur-series compound is less than the above-described range, the content of the carbon material relatively increases in the sulfur-carbon composite increasing a specific surface area, and a binder content increases when preparing slurry. Such an increase in the amount of a binder used resultantly increases sheet resistance of a positive electrode performing a role of an insulator preventing electron migration (electron pass), and battery performance may decline therefrom. On the contrary, when the sulfur-series compound content is greater than the above-mentioned range, sulfurs or sulfur compounds that do not bind with the carbon material aggregate by themselves or are re-eluted to the surface of the porous carbon material making it difficult to receive electrons and thereby to participate in an electrochemical reaction, and as a result, battery capacity loss may occur.

The sulfur-carbon composite may be composited by simply mixing the sulfur-series compound and the carbon material described above, or may have a core-shell-structured coating form or a supported form. The core-shell-structured coating form means any one of the sulfur-series compound or the carbon material coating the other material, and may be, for example, the carbon material surface being covered by the sulfur-series compound or vice versa. In addition, the supported form may be a form of supporting the sulfur-series compound inside the carbon material. The sulfur-carbon composite may have any form as long as it satisfies the content ratio of the sulfur-series compound and the carbon material provided above, and the form is not limited in the present invention.

An average diameter of the sulfur-carbon composite according to the present invention is not particularly limited in the present invention and may vary, but may be from 0.5 μm to 20 μm. For example, the sulfur-carbon composite may have an average diameter of 0.5 μm or greater, 1 μm or greater, 1.5 μm or greater, 2 μm or greater or 2.5 μm or greater, and 11 μm or less, 13 μm or less, 15 μm or less, 17 μm or less, 19 μm or less or 20 μm or less.

The positive electrode active material may further include, in addition to the above-described composition, one or more additives selected from among transition metal elements, group IIIA elements, group IVA elements, sulfur compounds of these elements, and alloys of these elements and sulfur.

As the transition metal element, Sc, Ti, V, Cr, Mn, Fe, Co, Ni, Cu, Zn, Y, Zr, Nb, Mo, Tc, Ru, Rh, Pd, Os, Ir, Pt, Au, Hg or the like may be included. As the group IIIA element, Al, Ga, In, Ti or the like may be included, and as the group IVA element, Ge, Sn, Pb or the like may be included.

The conductor is a material connecting an electrolyte and a positive electrode active material to perform a role of a path through which electrons migrate from a current collector to the positive electrode active material, and materials having conductivity may be used without limit.

For example, as the conductor, carbon black such as Super-P, denka black, acetylene black, ketjen black, channel black, furnace black, lamp black, thermal black or carbon black; carbon derivatives such as carbon nanotubes, graphene or fullerene; conductive fibers such as carbon fiber or metal fibers; fluorocarbon, aluminum and metal powders such as nickel powder; or conductive polymers such as polyaniline, polythiophene, polyacetylene or polypyrrole may be used either alone or as a mixture.

The conductor may be added in 0.01% by weight to 30% by weight based on the total weight of the mixture including the positive electrode active material.

The binder is for keeping the positive electrode active material on the positive electrode current collector, and organically linking the positive electrode active materials to further increase binding force between them, and all binders known in the art may be used.

Example of the binder may include one type selected from the group consisting of fluorine resin-based binders including polyvinylidene fluoride (PVdF) Or polytetrafluoroethylene (PTFE); rubber-based binders including styrene butadiene rubber (SBR), acrylonitrile-butadiene rubber or styrene-isoprene rubber; cellulose-based binders including carboxyl methyl cellulose (CMC), starch, hydroxypropyl cellulose or regenerated cellulose; polyalcohol-based binders; polyolefin-based binders including polyethylene and/or polypropylene; polyimide-based binders; polyester-based binders; and silane-based binders, or mixtures or copolymers of two or more types thereof.

The binder may be included in 0.5% by weight to 30% by weight based on the total weight of the mixture including the positive electrode active material. When the binder content is less than 0.5% by weight, physical properties of the positive electrode decline eliminating the active material and the conductor in the positive electrode, and when the content is greater than 30% by weight, a ratio of the active material and the conductor relatively decreases in the positive electrode reducing battery capacity.

The positive electrode of the present invention including the above-described composition, specifically the positive electrode active material layer, may have porosity of 60% to 80% and preferably 65% to 75%. When the positive electrode has porosity of less than 60%, the degree of filling of the positive electrode active material layer including the positive electrode active material, the conductor and the binder increases too much, and battery output properties and cycle properties may decline since sufficient electrolyte liquid that may exhibit ionic conductivity and/or electrical conductivity between the positive electrode active materials is not maintained, and an overvoltage and a decrease in discharge capacity become severe in the battery. On the contrary, when the positive electrode has excessively high porosity of greater than 80%, physical and electrical connections with the current collector decrease resulting in a problem of reducing adhesive strength, which makes the reaction difficult, and a problem of reducing battery energy density may occur due to the electrolyte liquid filling the increased porosity. Accordingly, the porosity is properly adjusted within the above-mentioned range.

The positive electrode may be prepared using common methods known in the art. For example, the positive electrode may be prepared by preparing slurry by mixing a solvent, and, as necessary, additives such as a binder, a conductor and a filler to a positive electrode active material and stirring the result, then coating the slurry on a current collector made of a metal material, and compressing and drying the result.

Specifically, the binder is dissolved in a solvent for preparing slurry first, and then a conductor is dispersed thereinto. As the solvent for preparing the slurry, those capable of uniformly dispersing the positive electrode active material, the binder and the conductor and readily evaporating are preferably used, and typical examples thereof may include acetonitrile, methanol, ethanol, tetrahydrofuran, water, isopropyl alcohol and the like. Next, the positive electrode active material, or selectively together with the additives, is uniformly dispersed again in the conductor-dispersed solvent to prepare positive electrode slurry. The amounts of the solvent, the positive electrode active material, or, selectively, the additives included in the slurry do not carry an important meaning in the present application, and it is sufficient that the slurry has proper viscosity to be readily coated. The slurry prepared as above is coated on a current collector, and dried to form a positive electrode. The slurry may be coated on a current collector to a proper thickness depending on the slurry viscosity and the thickness of the positive electrode to form.

The coating may be conducted using methods commonly known in the art, and for example, the positive electrode active material slurry is distributed on an upper surface of one side of the positive electrode current collector, and uniformly dispersing the slurry using a doctor blade or the like. In addition thereto, the coating may be conducted using a method such as die casting, comma coating or screen printing.

The drying is not particularly limited, but may be conducted within 1 day in a vacuum oven of 50° C. to 200° C.

The positive electrode of the present invention prepared using the above-described compositions and methods is classified by an SC factor value represented by the following Mathematical Formula 1.

$$SC \text{ factor} = \alpha \times \frac{L}{P} \quad \text{[Mathematical Formula 1]}$$

(In Mathematical Formula 1,

P is porosity (%) of the positive electrode active material layer in the positive electrode, L is a sulfur mass (mg/cm$^2$) per unit area of the positive electrode active material layer in the positive electrode, and $\alpha$ is 10 (constant)).

The lithium secondary battery according to the present invention accomplishes high energy density by an organic binding of, as well as the positive electrode described above, a negative electrode, a separator, an electrolyte and the like to describe later, and according to the present invention, in order for the lithium secondary battery to accomplish high energy density, the SC factor value may be 0.45 or greater, and preferably 0.5 or greater. Although an upper limit of the SC factor value is not particularly limited in the present invention, the SC factor value may be 4.5 or less when considering actual driving of the lithium secondary battery. In existing lithium secondary batteries, performance such as energy density of the battery declines when the SC factor value is 0.45 or greater, however, in the lithium secondary battery according to the present invention, battery performance is maintained without declining in actual driving.

Negative Electrode

The negative electrode according to the present invention may be formed with a negative electrode current collector, and a negative electrode active material layer formed on one surface or both surfaces thereof. Alternatively, the negative electrode may be a lithium metal plate.

The negative electrode active material layer may include a negative electrode active material, and selectively, a conductor and a binder.

As the negative electrode active material, a material capable of reversibly intercalating or deintercalating lithium ions (Lit), a material capable of reversibly forming a lithium-containing compound by reacting with lithium ions, lithium metal or a lithium alloy may be included.

Examples of the material capable of reversibly intercalating or deintercalating lithium ions may include crystalline carbon, amorphous carbon or a mixture thereof.

Examples of the material capable of reversibly forming a lithium-containing compound by reacting with lithium ions may include tin oxide, titanium nitrate or silicon.

Examples of the lithium alloy may include alloys of lithium (Li) and metals selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) and tin (Sn).

Preferably, the negative electrode active material may be lithium metal, and specifically, may have a form of lithium metal thin film or lithium metal powder.

As for constitutions of the current collector, the conductor, the binder and the like other than the negative electrode active material and a method for preparing a negative electrode, the materials, the methods and the like used in the positive electrode described above may be used.

Separator

The separator according to the present invention is a separator performing a role of both physically separating the positive electrode and negative electrode and adsorbing lithium polysulfide, and includes a porous substrate.

The porous substrate forming the separator of the present invention enables lithium ion transport between the positive electrode and the negative electrode while separating or insulating the negative electrode and the positive electrode from each other. The porous substrate may be formed with non-conductive or insulating materials, and may be an independent member such as a film.

Specifically, as the porous substrate, a porous polymer film may be used either alone or as a laminate thereof, and for example, porous polymer films made with a high-melting point glass fiber, a non-woven fabric formed with a polyethylene terephthalate fiber and the like, or a polyolefin-based polymer such as an ethylene homopolymer, a propylene homopolymer, an ethylene/butene copolymer, an ethylene/hexene copolymer and an ethylene/methacrylate copolymer may be used, however, the porous substrate is not limited thereto.

A material of the porous substrate is not particularly limited in the present invention, and porous substrates commonly used in a lithium secondary battery may all be used. For example, the porous substrate may include one or more types of materials selected from the group consisting of polyolefin such as polyethylene or polypropylene, polyester such as polyethylene terephthalate or polybutylene terephthalate, polyamide, polyacetal, polycarbonate, polyimide, polyether ether ketone, polyethersulfone, polyphenylene oxide, polyphenylene sulfide, polyethylene naphthalate, polytetrafluoroethylene, polyvinylidene fluoride, polyvinyl chloride, polyacrylonitrile, cellulose, nylon, poly(para-phenylene benzobisoxazole and polyarylate.

A thickness of the porous substrate is not particularly limited, but may be from 1 μm to 100 μm, and preferably from 5 μm to 50 μm. The thickness range of the porous substrate is not limited to the above-described range, however, when the thickness is too smaller than the above-described lower limit, mechanical properties decline, which may readily damage the separator during battery use.

An average diameter of the pores present in the porous substrate and porosity are not particularly limited as well, but may be from 0.001 μm to 50 μm and 10% to 95%, respectively.

Electrolyte Liquid

The electrolyte liquid according to the present invention is, as a non-aqueous electrolyte liquid including a lithium salt, formed with a lithium salt and a solvent. The electrolyte liquid has density of less than 1.5 g/cm$^3$. When the electrolyte liquid has density of 1.5 g/cm$^3$ or greater, the lithium secondary battery is difficult to accomplish high energy density due to a weight increase in the electrolyte liquid.

The lithium salt is a material that may be readily dissolved in a non-aqueous organic solvent, and examples thereof may include one or more selected from the group consisting of LiCl, LiBr, LiI, LiClO$_4$, LiBF$_4$, LiB$_{10}$Cl$_{10}$, LiB(Ph)$_4$, LiC$_4$BO$_8$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC (CF$_3$SO$_2$)$_3$, LiN (CF$_3$SO$_2$)$_2$, LiN (C$_2$F$_5$SO$_2$)$_2$, LiN(SO$_2$F)$_2$, chloroborane lithium, lower aliphatic carboxylic acid lithium, lithium tetraphenylborate and lithium imide. In one specific embodiment of the present invention, the lithium salt may be preferably lithium imide such as LiTFSI.

The concentration of the lithium salt may be from 0.1 M to 8.0 M, and may be specifically 0.1 M or greater, 0.5 M or greater or 1.0 M or greater and may be 3.0 M or less, 5.0 M or less or 8.0 M or less depending on various factors such as an accurate composition of the electrolyte liquid mixture, solubility of the salt, conductivity of the dissolved salt, charge and discharge conditions of a battery, a working temperature, and other factors known in the lithium secondary battery field. When the lithium salt concentration is less than the above-mentioned range, conductivity of the electrolyte liquid may decrease causing decline in the battery performance, and when the lithium salt concentration is greater than the above-mentioned range, viscosity of the electrolyte liquid increases leading to a decrease in the lithium ion (Lit) mobility, and therefore, a proper concentration is preferably selected in the above-mentioned range.

The solvent includes a first solvent and a second solvent. The first solvent has a highest dipole moment per unit volume among the constituents included in 1% by weight or greater in the solvent, and accordingly, has high dipole moment and low viscosity. Using a solvent with a high dipole moment is effective in improving solid-state reactivity of sulfur, and such an effect may be obtained well when the solvent itself has low viscosity. In the present invention, the first solvent is classified by a $DV^2$ factor represented by the following Mathematical Formula 2.

$$DV^2 \text{ factor} = \gamma \times \frac{\mu}{DV} \qquad \text{[Mathematical Formula 2]}$$

(In Mathematical Formula 2,
DV is a dipole moment per unit volume (D·mol/L),
$\mu$ is viscosity of the solvent (cP, 25° C.), and
$\gamma$ is 100 (constant)).

According to the present invention, the $DV^2$ factor value may be 1.75 or less, and preferably 1.5 or less. Although a lower limit of the $DV^2$ factor value is not particularly limited in the present invention, the $DV^2$ factor value may be 0.1 or greater when considering actual driving of the lithium secondary battery. When mixing a solvent having a $DV^2$ factor value of 1.75 or less such as the first solvent, battery performance does not decline even when using a positive electrode having low porosity and having a high loading amount of sulfur, a positive electrode active material, in a lithium-sulfur secondary battery since functionality of an electrolyte liquid may be maintained the same.

In the present invention, the first solvent is not particularly limited in the type as long as it has the $DV^2$ factor value included in the above-mentioned range, but may include one or more types selected from the group consisting of propionitrile, dimethylacetamide, dimethylformamide, gamma-butyrolactone, triethylamine and 1-iodopropane.

The first solvent may be included in 1% by weight to 50% by weight, and specifically in 1% by weight or greater, 5% by weight or greater or 10% by weight or greater and may be in 30% by weight or less, 40% by weight or less or 50% by weight or less based on the total weight of the solvent forming the electrolyte liquid. When the solvent according to the present invention includes the first solvent in the above-described % by weight range, an effect of improving battery performance may be obtained even when using with a positive electrode having low porosity and a high loading amount of sulfur, a positive electrode active material.

The lithium secondary battery of the present invention may be further classified by an NS factor combining the SC factor and the $DV^2$ factor. The NS factor is represented by the following Mathematical Formula 3.

$$NS \text{ factor} = \frac{DV^2 \text{ factor}}{SC \text{ factor}} \qquad \text{[Mathematical Formula 3]}$$

(In Mathematical Formula 3,
SC factor has the same value as defined in Mathematical Formula 1, and
$DV^2$ factor has the same value as defined in Mathematical Formula 2).

In the present invention, the NS factor value may be 3.5 or less, 3.0 or less or 2.7 or less. Although a lower limit of the NS factor value is not particularly limited in the present invention, the NS factor value may be 0.1 or greater when considering actual driving of the lithium secondary battery. When the NS factor value is adjusted to be in the above-mentioned range, an effect of improving performance of the lithium secondary battery may be more superior.

In the present invention, the second solvent is a fluorinated ether-based solvent. In order to control viscosity of an electrolyte liquid in the art, solvents such as dimethoxyethane and dimethyl carbonate have been used as a diluent, and when using such a solvent as a diluent, a battery including a high loading and low porosity positive electrode as in the present invention may not be driven. Accordingly, in the present invention, the second solvent is added with the first solvent in order to drive the positive electrode according to the present invention. The second solvent is not particularly limited in the type as long as it is a fluorinated ether-based solvent generally used in the art, but may include one or more types selected from the group consisting of 1H,1H,2'H,3H-decafluorodipropyl ether, difluoromethyl 2,2,2-trifluoroethyl ether, 1,2,2,2-tetrafluoroethyl trifluoromethyl ether, 1,1,2,3,3,3-hexafluoropropyl difluoromethyl ether, pentafluoroethyl 2,2,2-trifluoroethyl ether and 1H,1H, 2'H-perfluorodipropyl ether.

The second solvent may be included in 50% by weight to 99% by weight, preferably in 60% by weight to 95% by weight, and more preferably in 70% by weight to 90% by weight based on the total weight of the solvent forming the electrolyte liquid. When the solvent according to the present invention includes the second solvent in the above-described % by weight range, an effect of improving battery performance may be obtained even when using with a positive electrode having low porosity and a high loading amount of sulfur, a positive electrode active material, like the first solvent. When mixing the first solvent and the second solvent, the second solvent may be included in the electrolyte liquid in the same or more amount compared to the first solvent considering a battery performance improving effect. According to the present invention, the solvent may include the first solvent and the second solvent in a weight ratio of 1:1 to 1:9 and preferably 3:7 to 1:9 (first solvent:second solvent).

The non-aqueous electrolyte liquid for a lithium-sulfur secondary battery of the present invention may further include a nitrate or nitrite-based compound as an additive. The nitrate or nitrite-based compound is effective in forming a stable film on the lithium electrode and enhancing charge and discharge efficiency. Such a nitrate or nitrite-based compound is not particularly limited in the present invention, however, one type selected from the group consisting of inorganic-based nitrate or nitrite compounds such as lithium nitrate ($LiNO_3$), potassium nitrate ($KNO_3$), cesium nitrate ($CsNO_3$), barium nitrate ($Ba(NO_3)_2$), ammonium nitrate ($NH_4NO_3$), lithium nitrite ($LiNO_2$), potassium nitrite ($KNO_2$), cesium nitrite ($CsNO_2$) and nitrite ammonium ($NH_4NO_2$); organic-base nitrate or nitrite compounds such as methyl nitrate, dialkyl imidazolium nitrate, guanidine nitrate, imidazolium nitrate, pyridinium nitrate, ethyl nitrite, propyl nitrite, butyl nitrite, pentyl nitrite and octyl nitrite; organic nitro compounds such as nitromethane, nitropropane, nitrobutane, nitrobenzene, dinitrobenzene, nitro pyridine, dinitropyridine, nitrotoluene and dinitrotoluene, and combinations thereof may be used, and preferably, lithium nitrate is used.

In addition, the electrolyte liquid may further include other additives with the purpose of improving charge and discharge properties, flame retardancy and the like. Examples of the additive may include pyridine, triethylphosphite, triethanolamine, cyclic ether, ethylenediamine, n-glyme, hexaphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride, fluoroethylene carbonate (FEC), propene sultone (PRS), vinylene carbonate (VC) and the like.

The lithium secondary battery according to the present invention is classified by an ED factor value represented by the following Mathematical Formula 4.

$$ED \text{ factor} = V \times SC \text{ factor} \times \frac{C}{D} \quad \text{[Mathematical Formula 4]}$$

(In Mathematical Formula 4,

V is a discharge nominal voltage (V) for Li/Li$^+$,

SC factor has the same value as defined in Mathematical Formula 1,

C is discharge capacity (mAh/g) when discharging at a 0.1 C rate, and

D is density (g/cm$^3$) of the electrolyte liquid).

The ED factor may accomplish high energy density in an actual lithium secondary battery as the value is higher. According to the present invention, the ED factor value may be 850 or greater, preferably 870 or greater, and more preferably 891 or greater. Although an upper limit of the ED factor value is not particularly limited in the present invention, the ED factor value may be 10,000 or less when considering actual driving of the lithium secondary battery. The ED factor value range means that the lithium secondary battery according to the present invention is capable of obtaining more enhanced energy density compared to existing lithium secondary batteries.

The lithium secondary battery of the present invention may be manufactured by disposing a separator between a positive electrode and a negative electrode to form an electrode assembly, placing the electrode assembly in a cylindrical battery case or an angular battery case, and then injecting an electrolyte thereto. Alternatively, the lithium-sulfur secondary battery of the present invention may also be manufactured by laminating the electrode assembly, impregnating the electrode assembly into an electrolyte, and placing the obtained result in a battery case and sealing the result.

In addition, the present invention provides a battery module including the lithium secondary battery as a unit cell.

The battery module may be used as a power supply of medium to large-sized devices requiring high-temperature stability, long cycle properties and high capacity properties.

Examples of the medium to large-sized device may include power tools operated through receiving electric power by a battery motor; electric vehicles including electric vehicles (EV), hybrid electric vehicles (HEV), plug-in hybrid electric vehicles (PHEV) and the like; electric two-wheeled vehicles including electric bikes (e-bikes) and electric scooters (e-scooters); electric golf carts; systems for power storage, and the like, but are not limited thereto.

Lithium Secondary Battery (2)

A lithium secondary battery according to another embodiment of the present invention relates to a lithium secondary battery including a positive electrode, a negative electrode, a separator and an electrolyte liquid, wherein the positive electrode has an SC factor value represented by Mathematical Formula 1 of 0.45 or greater, the electrolyte liquid includes a solvent and a lithium salt, and the solvent includes a first solvent having a DV$^2$ factor value represented by Mathematical Formula 2 of 1.75 or less; and a second solvent that is a fluorinated ether-based solvent, the positive electrode includes a sulfur-carbon composite containing a surface-modified carbon material, and a content of carbon included in the carbon material may be 98% by weight or greater.

Herein, details on the constitutions of the positive electrode other than the surface-modified carbon material included in the sulfur-carbon composite included in the positive electrode of the lithium secondary battery, and the negative electrode, the separator and the electrolyte liquid are as disclosed in the lithium secondary battery according to one embodiment.

In the lithium secondary battery according to another embodiment of the present invention, the 'surface-modified carbon material' means a carbon material of which surface is modified to a form capable of uniformly supporting sulfur by heat treatment.

A general carbon material, that is, a carbon material that is not heat treated may also include functional groups including oxygen and hydrogen in addition to carbon, and a content of carbon included in the carbon material that is not heat treated may be 97.5% by weight or less. In addition, the functional group including oxygen and hydrogen may be one or more types selected from the group consisting of hydroxyl, carboxy and ketone. The functional group may be a hydrophilic functional group.

The carbon material has an increased carbon content by removing the functional groups through heat treatment, and a content of carbon included in the heat-treated carbon material may be 98% by weight or greater based on a total weight of the carbon material. In addition, the carbon content may be, although not particularly limited thereto, less than 100% by weight. When the carbon content is less than 98% by weight, the supported amount of sulfur decreases in the carbon material surface form by the functional group present on the carbon material surface, and it may be difficult for the sulfur to be uniformly supported.

The carbon material may have a specific surface area of 280 m$^2$/g or greater, 285 m$^2$/g or greater or 290 m$^2$/g or greater, and may be 500 m$^2$/g or less, 1000 m$^2$/g or less, 1500 m$^2$/g or less, 2000 m$^2$/g or less, 2500 m$^2$/g or less, 3000 m$^2$/g or less, 3500 m$^2$/g or less or 4500 m$^2$/g or less. Herein, the specific surface area may be measured through a common BET method. The specific surface area of the microporous carbon material being less than 280 m$^2$/g has a problem of reducing reactivity due to a decrease in the contact area with sulfur, and the specific surface area being greater than 4500 m²/g on the contrary may have a problem of increasing side reactions due to the excessive specific surface area and a problem of increasing an added amount of a binder required for preparing positive electrode slurry.

The carbon material may have a pore volume of 2.3 cm³/g or greater, 2.4 cm³/g or greater or 2.5 cm³/g or greater, and may be 3.0 cm³/g or less, 3.5 cm³/g or less, 4.0 cm³/g or less, 4.5 cm³/g or less or 5 cm³/g or less. Herein, the pore volume may be measured through a common BET method. When the pore volume of the microporous carbon material is less than 2.3 cm³/g, sulfur is not favorably impregnated into the pore structure, and the pore volume being greater than 5 cm³/g on the contrary may have a problem of increasing electrode porosity, which leads to an increase in the electrolyte liquid amount required to fill the pores making it difficult to accomplish high energy density. The form of the carbon material may be a globular type, a rod type, a needle type, a plate type, a fiber type, a tube type or a bulk type, and may be used without limit as long as it is commonly used in a lithium-sulfur secondary battery.

In the positive electrode of the lithium secondary battery according to another embodiment of the present invention, the sulfur-carbon composite including the carbon material of which surface is modified by heat treatment may reduce the sulfur from leaking to the electrolyte, and may increase electrical conductivity of the electrode including the sulfur.

The content of the sulfur and the carbon material included in the sulfur-carbon composite, and the types of the sulfur and the carbon material are the same as those of the sulfur-carbon composite included in the positive electrode of the lithium secondary battery according to one embodiment of the present invention.

In the positive electrode of the lithium secondary battery according another embodiment of the present invention, the sulfur-carbon composite including the heat-treated carbon may have a specific surface area of 10 m²/g or greater, 12 m²/g or greater, 13 m²/g or greater or 14 m²/g or greater, and may be 15 m²/g or less, 16 m²/g or less, 17 m²/g or less or 20 m²/g or less. The sulfur-carbon composite including the heat-treated carbon having a specific surface area of less than 10 m²/g is not preferred in that sulfur is not evenly impregnated into the carbon material surface causing decline in the cell performance, and the specific surface area being greater than 20 m²/g is not preferred in terms of increasing an added amount of a binder when preparing the electrode.

In the present invention, the heat-treated sulfur-carbon composite may have a pore volume of 0.04 cm³/g to 1 cm³/g, and specifically 0.04 cm³/g or greater, 0.05 cm³/g or greater or 0.06 cm³/g or greater and 0.5 cm³/g or less, 0.8 cm³/g or less or 1 cm³/g or less. The sulfur-carbon composite having a pore volume of less than 0.04 cm³/g is not preferred in that sulfur is separately present on the surface or aggregates without being impregnated into the sulfur-carbon composite, and the pore volume being greater than 1 cm³/g is not preferred in that pores of the sulfur-composite are not used despite the plenty of space for the sulfur to be impregnated, which makes it difficult to prepare an electrode with high energy density.

The lithium secondary battery according to another embodiment of the present invention preferably has an SC factor of 0.6 to 0.7, an ED factor of 1300 or greater, 1400 or greater, 1500 or greater or 1600 or greater.

In the lithium secondary battery according to another embodiment of the present invention, the sulfur-carbon composite may be prepared using a carbon material of which surface is modified by heat treatment, and the carbon material of which surface is modified by heat treatment may have a carbon content, a specific surface area and a pore area as described above.

The sulfur-carbon composite may be prepared through steps of (P1) heat treating a carbon material under an inert gas; and (P2) impregnating sulfur into the heat-treated carbon material.

In (P1), the heat treatment temperature may be 700° C. or higher, 750° C. or higher or 800° C. or higher, and may be 900° C. or lower, 950° C. or lower or 1000° C. or lower. When the heat treatment temperature is lower than 700° C., the carbon material is surface modified not as much as desired leading to insignificant increases in the carbon content, the specific surface area and the pore volume, and when the heat treatment temperature is higher than 1000° C., properties of the carbon material change decreasing conductivity.

In addition, the heat treatment time may be 1 hour or longer, 1.5 hours or longer or 2.5 hours or longer, and may be 4 hours or shorter, 4.5 hours or shorter or 5 hours or shorter, but is not limited thereto as long as it is a time capable of sufficiently increasing the carbon content, the specific surface area and the pore volume.

The inert gas may include one or more types selected from the group consisting of nitrogen, helium, argon, neon, krypton, xenon and radon, and may preferably be nitrogen.

In addition, in (P2), sulfur may be impregnated into the heat-treated carbon material. Specifically, after mixing the heat-treated carbon material and sulfur, the sulfur may be impregnated into the carbon material using a melt diffusion method.

Lithium Secondary Battery (3)

A lithium secondary battery according to still another embodiment of the present invention relates to a lithium secondary battery including a positive electrode, a negative electrode, a separator and an electrolyte liquid, wherein the positive electrode has an SC factor value represented by Mathematical Formula 1 of 0.45 or greater, the electrolyte liquid includes a solvent and a lithium salt, and the solvent includes a first solvent having a $DV^2$ factor value represented by Mathematical Formula 2 of 1.75 or less; and a second solvent that is a fluorinated ether-based solvent, and the separator may include a porous substrate, and a molybdenum disulfide coating layer formed on at least one surface of the porous substrate.

Herein, descriptions on the positive electrode, the negative electrode and the electrolyte liquid may be the same as those disclosed in the lithium secondary battery according to one embodiment.

In the lithium secondary battery according to still another embodiment of the present invention, the separator is a separator performing a role of both physically separating the positive electrode and negative electrode and adsorbing lithium polysulfide, and includes a porous substrate and a molybdenum disulfide coating layer formed on at least one surface of the porous substrate.

The porous substrate forming the separator is the same as disclosed in the porous substrate included in the separator included in the lithium secondary battery according to one embodiment.

By adsorbing lithium polysulfide while including the molybdenum disulfide coating layer, the separator may enhance capacity and lifetime of the lithium secondary battery by resolving a problem of sulfur loss caused by lithium polysulfide elution in existing lithium secondary batteries and capacity loss caused therefrom, and stable driving may be achieved even when high loading the sulfur.

In addition, by binding lithium polysulfide to the coating layer of the separator, the molybdenum disulfide may improve Coulombic efficiency and lifetime of the battery by resolving side reactions occurring on the negative electrode surface by a shuttle effect of the lithium polysulfide, for example, a problem of forming a high resistance layer of $Li_2S$ on the interface by reacting with lithium metal used as the negative electrode or growing lithium dendrite precipitating lithium on the negative electrode interface.

Particularly, regarding the problem of lithium dendrite growth, molybdenum disulfide has a layered structure and exhibits in-plane electron mobility (in-plane carrier mobility) of 200 $cm^2$/V.s to 500 $cm^2$/V.s, and therefore, lithium ions readily migrate as well as readily intercalating/deintercalating. Accordingly, by including the molybdenum disulfide coating layer, the separator of the present invention may reduce interfacial resistance of lithium metal and facilitate a constant lithium flow on the lithium metal surface, and may effectively suppress lithium dendrite growth through suppressing an electron migration rate on the lithium metal surface and facilitating uniform distribution of the lithium ions.

The molybdenum disulfide may have a nanosheet shape, and the nanosheet may have a thickness of 1 nm or greater, 2 nm or greater or 3 nm or greater, and may be 10 nm or less, 15 nm or less or 20 nm or less.

When forming the molybdenum disulfide coating layer on one surface of the porous substrate, the molybdenum disulfide coating layer may be disposed facing the negative electrode or the positive electrode, and the position is not particularly limited in the present invention. However, when the lithium-sulfur secondary battery of the present invention includes lithium metal as a negative electrode active material, the molybdenum disulfide coating layer is preferably disposed facing the negative electrode. Herein, by forming the molybdenum disulfide coating layer to face the negative electrode, lithium dendrite growth may be prevented as well as suppressing side reactions between the lithium polysulfide diffused from the positive electrode and the lithium metal, and as a result, battery lifetime and stability may increase.

In the separator included in the lithium secondary battery according to still another embodiment of the present invention, a thickness of the molybdenum disulfide coating layer is not particularly limited, and has a range not increasing internal resistance of the battery while securing the above-described effects. For example, the molybdenum disulfide coating layer may have a thickness of 0.1 μm or greater, 0.2 μm or greater or 0.3 μm or greater, and 1 μm or less, 5 μm or less or 10 μm or less. When the molybdenum disulfide coating layer has a thickness of less than 0.1 μm, functions as a coating layer may not be performed, and when the thickness is greater than 10 μm on the contrary, interfacial resistance increases causing an increase in the internal resistance when driving the battery.

A method for preparing the separator included in the lithium secondary battery according to still another embodiment of the present invention is not particularly limited, and known methods or various methods modifying the same may be used by those skilled in the art.

For example, the method for preparing the separator includes steps of,
(a) preparing a composition for coating including molybdenum disulfide, and
(b) coating the composition for coating on at least one surface of a porous substrate.

First, the (a) of preparing a composition for coating including molybdenum disulfide is conducted.

The molybdenum disulfide may be directly prepared or commercially purchased, and is not limited thereto.

The composition for coating may further include a solvent in addition to the above-described molybdenum disulfide, and the solvent is not particularly limited as long as it is capable of dissolving the molybdenum disulfide. For example, the solvent may be a mixed solvent of water and alcohol, or one organic solvent or a mixture of two or more thereof, and in this case, the alcohol may be a lower alcohol having 1 to 6 carbon atoms, preferably methanol, ethanol, propanol, isopropanol or the like. As the organic solvent, polar solvents such as acetic acid, dimethylformamide (DMF), N-methyl-2-pyrrolidone (NMP) and dimethyl sulfoxide (DMSO), nonpolar solvents such as acetonitrile, ethyl acetate, methyl acetate, fluoroalkane, pentane, 2,2,4-trimethylpentane, decane, cyclohexane, cyclopentane, diisobutylene, 1-pentene, 1-chlorobutane, 1-chloropentane, o-xylene, diisopropyl ether, 2-chloropropane, toluene, 1-chloropropane, chlorobenzene, benzene, diethyl ether, diethyl sulfide, chloroform, dichloromethane, 1,2-dichloroethane, aniline, diethylamine, ether, carbon tetrachloride, methylene chloride and tetrahydrofuran (THF) may be used. Preferably, one or more types selected from the group consisting of dimethylformamide, methylene chloride and N-methyl-2-pyrrolidone may be used.

As for the solvent content, the solvent may be included at a level having a concentration enough to readily conduct coating, and the specific content varies depending on the coating method and apparatus. For example, the composition for coating may be prepared by dispersing the defect-including molybdenum disulfide into the solvent and the mixing the result, and herein, the coating is conducted after adjusting the concentration of the final composition for coating to be in a range of 0.1% by weight to 10% by weight (solid content).

Subsequently, the (b) of coating the composition for coating described above on at least one surface of a porous substrate is conducted.

The coating in the (b) is not particularly limited in the present invention, and any known wet coating method may be used. For example, a method of uniformly dispersing using a doctor blade or the like, methods of die casting, comma coating, screen printing and vacuum filtration coating, and the like, may be used.

In addition, a drying process for removing the solvent may be further conducted after the (b). The drying process is performed at temperature and time capable of sufficiently removing the solvent, and the condition is not particularly mentioned in the present invention since it may vary depending on the solvent type. For example, the drying may be conducted in a 30° C. to 200° C. vacuum oven, and as the drying method, drying methods such as drying by warm air, hot air and low humidity air, and vacuum drying may be used. The drying time is not particularly limited, however, the drying is commonly conducted in a range of 30 seconds to 24 hours.

A thickness of the finally formed coating layer may be adjusted by adjusting the concentration of the composition for coating according to the present invention, the number of coatings, or the like.

The lithium secondary battery of the present invention may be manufactured by disposing a separator between a positive electrode and a negative electrode to form an electrode assembly, placing the electrode assembly in a cylindrical battery case or an angular battery case, and then injecting an electrolyte thereto. Alternatively, the lithium secondary battery of the present invention may also be manufactured by laminating the electrode assembly, impregnating the electrode assembly into an electrolyte, and placing the obtained result in a battery case and sealing the result.

In addition, the present invention provides a battery module including the lithium secondary battery as a unit cell.

The battery module may be used as a power supply of medium to large-sized devices requiring high-temperature stability, long cycle properties and high capacity properties.

Examples of the medium to large-sized device may include power tools operated through receiving electric power by a battery motor; electric vehicles including electric vehicles (EV), hybrid electric vehicles (HEV), plug-in hybrid electric vehicles (PHEV) and the like; electric two-wheeled vehicles including electric bikes (e-bikes) and electric scooters (e-scooters); electric golf carts; systems for power storage, and the like, but are not limited thereto.

Hereinafter, preferred examples will be provided in order to illuminate the present invention, however, the following examples are for illustrative purposes only, and it will be obvious to those skilled in the art that various changes and modifications may be made within the category and technological ideas of the present invention, and such changes and modifications also fall within the scope of the attached claims.

Experiments Depending on Heat Treatment of Carbon Material and Solvent Type of Electrolyte Liquid Preparation Example 1: Preparation of Sulfur-Carbon Composite Including Surface-Modified Carbon Material (Heat Treated Group)

Carbon nanotubes (CNT) were heat treated and surface-modified in a tube furnace (HanTech Co., Ltd., HTF-Q70) under the nitrogen atmosphere and 820° C. temperature condition.

After mixing the heat-treated CNT and sulfur in a weight ratio of 30:70, the sulfur was impregnated into the heat-treated CNT using a melt diffusion method in a convection oven (Jeio Tech Co., Ltd., OF-22) to prepare a sulfur-carbon composite including a surface-modified carbon material.

Comparative Preparation Example 1: Preparation of Sulfur-Carbon Composite (Untreated Group)

A sulfur-carbon composite was prepared in the same manner as in Preparation Example 1 except that CNT that is not heat treated was used.

Example 1

(1) Preparation of Positive Electrode

90% by weight of the sulfur-carbon composite including a surface-modified carbon material prepared in Preparation Example 1 (heat treated group), 5% by weight of styrene butadiene rubber/carboxymethyl cellulose (SBR/CMC 7:3) as a binder, and 5% by weight of denka black as a conductor were mixed, and dissolved in water to prepare positive electrode slurry having a concentration (concentration based on solid content) of 20%.

The positive electrode slurry was coated on an aluminum current collector to form a positive electrode active material layer, and the layer was dried and rolled to prepare a positive electrode. In the prepared positive electrode, porosity of the positive electrode active material layer calculated based on the electrode weight and the electrode thickness (using a TESA-pHITE device manufactured by TESA) was 70%, and a mass of sulfur per unit area of the positive electrode active material layer was 4.7 mg/cm$^2$. An SC factor value calculated based thereon was 0.6817.

(2) Manufacture of Lithium-Sulfur Secondary Battery

The positive electrode prepared using the above-described method, and a negative electrode were placed to face each other, and a polyethylene separator having a thickness of 20 μm and porosity of 45% was provided between the positive electrode and the negative electrode.

After that, an electrolyte liquid was injected into the case to manufacture a lithium-sulfur secondary battery. Herein, the electrolyte liquid was prepared by dissolving lithium bis(trifluoromethylsulfonyl)imide (LiTFSI) having a concentration of 3.0 M concentration in an organic solvent, and as the organic solvent herein, a solvent obtained by mixing propionitrile (first solvent) and 1H,1H,2'H,3H-decafluorodipropyl ether (second solvent) in a 3:7 weight ratio (w/w) was used. A dipole moment per unit volume was 97.1 D·mol/L in the first solvent, and viscosity of the solvent measured using a LVDV2T-CP viscometer manufactured by BROOKFIELD AMETEK Inc. was 0.38 cP. A DV$^2$ factor value calculated based thereon was 0.39. The manufactured battery was charged and discharged at 45° C.

Comparative Example 1

A lithium-sulfur secondary battery was manufactured in the same manner as in Example 1 except that the sulfur-carbon composite prepared in Comparative Preparation Example 1 (untreated group) was used.

Comparative Example 2

A lithium-sulfur secondary battery was manufactured in the same manner as in Example 1 except that the sulfur-carbon composite prepared in Comparative Preparation Example (untreated group) and a comparative electrolyte liquid were used. The comparative electrolyte liquid was prepared by adding 1% by weight of LiNO$_3$ to an organic solvent, and the organic solvent is a solvent obtained by mixing dioxolane (DOL) (first solvent) and dimethoxyethane (DME) (second solvent) in a volume ratio of 5:5 (comparative electrolyte liquid: DOL:DME (5:5, v/v), 1.0 M LiTFSI, 1.0 wt % LiNO$_3$).

Comparative Example 3

A lithium-sulfur secondary battery was manufactured in the same manner as in Example 1 except that a comparative electrolyte liquid was used. The comparative electrolyte liquid was prepared by adding 1% by weight of LiNO$_3$ to an organic solvent, and the organic solvent is a solvent obtained by mixing dioxolane (DOL) (first solvent) and dimethoxyethane (DME) (second solvent) in a volume ratio of 5:5 (comparative electrolyte liquid: DOL:DME (5:5, v/v), 1.0 M LiTFSI, 1.0 wt % LiNO$_3$).

Experimental Example 1

For the surface-modified sulfur-carbon composite (heat treated group) and the sulfur-carbon composite (untreated group) respectively prepared in Preparation Example 1 and Comparative Preparation Example 1, experiments on the surface shape, the specific surface area, the porosity and the thermogravimetric analysis were conducted.

(1) Analysis on Component of Carbon Material Depending on Heat Treatment

Components of the CNT heat treated in Preparation Example 1 and the CNT that is not heat treated of Comparative Preparation Example 1 were analyzed, and the results are as shown in the following Table 1. An elemental analyzer (EA, Thermo Scientific™, Flash 2000) was used for the component analysis.

TABLE 1

|  |  | C | H | O |
|---|---|---|---|---|
| Comparative Preparation Example 1 | CNT Before Heat Treatment | 97.3 | <1 | <1 |
| Preparation Example 1 | CNT After Heat Treatment | 98.9 | <1 | <1 |

As shown in Table 1, it was seen that the carbon (C) content increased in the CNT when heat treating the CNT.

(2) Specific Surface Area and Porosity

For the heat-treated CNT and the sulfur-carbon composite using the same (heat treated group) prepared in Preparation Example 1 and the CNT and the sulfur-carbon composite using the same (untreated group) of Comparative Preparation Example 1, specific surface area and pore volume were measured, and the results are as shown in the following Table 2. Herein, the specific surface area ($a_s$) and the pore volume were measured using a common BJH (barrett-joyner-halenda) method.

TABLE 2

|  |  | CNT | Sulfur-Carbon Composite |
|---|---|---|---|
| $a_s$ ($m^2$/g) | Comparative Preparation Example 1 (Before Heat Treatment) | 273.89 | 9.07 |
|  | Preparation Example 1 (After Heat Treatment) | 293.47 | 14.73 |
| Pore Volume ($cm^3$/g) | Comparative Preparation Example 1 (Before Heat Treatment) | 2.2379 | 0.0378 |
|  | Preparation Example 1 (After Heat Treatment) | 2.5824 | 0.0694 |

As shown in Table 2, it was seen that specific surface area and pore volume increased when heat treating the CNT, and the sulfur-carbon composite including the heat-treated CNT also had increased specific surface area and pore volume.

(3) Observation on Surface Shape

FIG. 1 shows scanning electron microscope (SEM) images of the sulfur-carbon composite including surface-modified CNT (heat treated group) and the sulfur-carbon composite including CNT (untreated group) respectively prepared in Preparation Example 1 and Comparative Preparation Example 1. The SEM image is photographed using a SEM measurement device (JEOL, JSM7610F).

When referring to FIG. 1, the shape of sulfur being partially aggregated on the entangled CNT surface was seen in Comparative Preparation Example 1 compared to the sulfur-carbon composite of Preparation Example 1, and from this, it was seen that the sulfur was non-uniformly impregnated to the inside.

(4) Measurement of Powder Resistance

FIG. 2 shows a powder resistance measurement graph of the sulfur-carbon composite including surface-modified CNT (heat treated group) and the sulfur-carbon composite including CNT (untreated group) respectively prepared in Preparation Example 1 and Comparative Preparation Example 1.

The powder resistance measurement graph uses a value obtained by converting the resistance value of the powder measured while applying a pressure of 0 kgf to 2000 kgf to conductivity using a powder resistance measurement device (HanTech Co., Ltd., HPRM-FA2).

When referring to FIG. 2, conductivity of Preparation Example 1 was found to be higher compared to Comparative Preparation Example 1 at all measured pressure values. In addition, electrode conductivity is enhanced as the sulfur-carbon composite has high conductivity, and therefore, enhancement in the battery performance may be expected since resistance decreases during battery driving.

Experimental Example 2

Conditions of the positive electrodes and the secondary batteries each manufactured in the examples and the comparative examples are summarized and shown in the following Table 3.

Performance of each of the batteries manufactured in the examples and the comparative examples was evaluated using a charge and discharge measurement device (LAND CT-2100A, Wuhan, China). Battery performance was evaluated by conducting charge and discharge at a rate of 0.1 C, and for the first discharge result, an ED factor was calculated as defined in Mathematical Formula 4. The calculated results are shown in the following Table 3.

In addition, for each of the lithium-sulfur secondary batteries manufactured in Example 1 and Comparative Example 1, an ED factor value depending on the number of cycles was measured, and the results are shown in FIG. 3.

TABLE 3

|  | Heat Treatment | Electrolyte Liquid Type | SC factor | $DV^2$ factor | NS factor | ED factor |
|---|---|---|---|---|---|---|
| Comparative Example 1 | X | Electrolyte Liquid | 0.7725 | 0.39 | 0.6057 | 1255 |
| Example 1 | ○ |  | 0.6817 | 0.39 | 0.6865 | 1640 |
| Comparative Example 2 | X | Comparative Electrolyte Liquid | 0.7105 | 1.77 | 2.4912 | 1418 |
| Comparative Example 3 | ○ |  | 0.7037 | 1.77 | 2.5153 | 1563 |

Comparative electrolyte liquid: DOL:DME (5:5, v/v), 1.0M LiTFSI, 1.0 wt % LiNO₃
Electrolyte liquid: Propionitrile:1H,1H,2'H,3H-decafluorodipropyl ether (3:7, w/w), 3.0M LiTFSI When referring to Table 3 and FIG. 3, Example 1 using both the sulfur-carbon composite including the carbon material of which surface is modified by heat treatment and an electrolyte liquid (electrolyte liquid including a first solvent having a $DV^2$ factor value of 1.75 or less; and a second solvent that is a fluorinated ether-based solvent) had a relatively higher ED factor.

Through such a result, it was seen that the sulfur-carbon composite including the carbon material of which surface is modified by heat treatment exhibited more effective performance in an electrolyte liquid (electrolyte liquid including a first solvent having a $DV^2$ factor value of 1.75 or less; and a second solvent that is a fluorinated ether-based solvent).

Experiments Depending on Coating Layer Formation in Separator and Electrolyte Liquid Solvent Type Preparation Example 2

As a porous substrate, a 20 μm polyethylene (porosity 68%) film was prepared.

A composition for coating including molybdenum disulfide (product of Sigma Aldrich) in 1% by weight in ethanol, a solvent, was coated on the porous substrate to form a coating layer, and the result was dried for 12 hours at 60° C. to prepare a separator having the coating layer formed to a thickness of 1 μm.

Example 2

As a positive electrode active material, 90 parts by weight of a sulfur-carbon composite (S/C 7:3 parts by weight), 5 parts by weight of denka black as a conductor, and 5 parts by weight of styrene butadiene rubber/carboxymethyl cellulose (SBR/CMC 7:3) as a binder were introduced and mixed to prepare slurry for forming a positive electrode active material layer.

Then, the prepared slurry was coated on an aluminum current collector having a thickness of 20 μm, dried for 12 hours at 50° C., and compressed using a roll press device to prepare a positive electrode (loading amount of positive electrode: 6.6 mAh/cm$^2$). In the prepared positive electrode, porosity of the positive electrode active material layer was 68%, and a mass of sulfur per unit area of the positive electrode active material layer was 4.91 mg/cm$^2$. An SC factor value calculated based thereon was 0.72.

After placing the positive electrode and the negative electrode prepared using the above-described method to face each other, the separator prepared in Preparation Example 2 was provided therebetween so as for the coating layer to face the negative electrode, and as a result, an electrode assembly was prepared. Herein, lithium foil having a thickness of 60 μm was used as the negative electrode.

Subsequently, the electrode assembly was placed inside a case, and an electrolyte liquid was injected thereto to manufacture a lithium-sulfur secondary battery. Herein, the electrolyte liquid was prepared by dissolving lithium bis(trifluoromethylsulfonyl)imide (LiTFSI) having a concentration of 3 M in an organic solvent, and as the organic solvent herein, a solvent obtained by mixing propionitrile (first solvent) and 1H,1H,2'H,3H-decafluorodipropyl ether (second solvent) in a 3:7 weight ratio was used. A dipole moment per unit volume was 97.1 D·mol/L in the first solvent, and viscosity of the solvent measured using a LVDV2T-CP viscometer manufactured by BROOKFIELD AMETEK Inc. was 0.38 cP. A DV$^2$ factor value calculated based thereon was 0.39. The manufactured battery was charged and discharged at 45° C.

Comparative Example 4

A lithium-sulfur secondary battery was manufactured in the same manner as in Example 2 except that a porous substrate without forming the molybdenum disulfide coating layer was used as it is as the separator.

Comparative Example 5

A lithium-sulfur secondary battery was manufactured in the same manner as in Example 2 except that, by changing the preparation condition for the electrolyte liquid, an electrolyte liquid obtained by dissolving lithium bis(trifluoromethylsulfonyl)imide (LiTFSI) having a concentration of 1 M and 1% by weight of lithium nitrate (LiNO$_3$) in an organic solvent mixing 1,3-dioxolane and dimethyl ether in a volume ratio of 1:1 was used.

Conditions of the example and the comparative examples are summarized and shown in the following Table 4.

TABLE 4

| | Electrolyte Liquid Composition | SC factor | DV$^2$ factor | NS factor | ED factor |
|---|---|---|---|---|---|
| Example 2 | First Electrolyte Liquid Composition [1] | 0.72 | 0.39 | 0.54 | 1453 |
| Comparative Example 4 | | 0.72 | 0.39 | 0.54 | 1454 |
| Comparative Example 5 | Second Electrolyte Liquid Composition [2] | 0.72 | 2.07 | 2.86 | 1148 |

[1] First electrolyte liquid composition = propionitrile:1H,1H,2'H,3H-decafluorodipropyl ether (3:7, w/w) solvent, 3.0M LiTFSI
[2] Second electrolyte liquid composition = 1,3-dioxolane (DOL):dimethyl ether (DME) (1:1, v/v) solvent, 1.0M LiTFSI, 1 wt % LiNO$_3$ Experimental Example 3. Scanning Electron Microscope Analysis The separator prepared in Preparation Example 2 was observed using a scanning electron microscope (SEM). As the scanning electron microscope, S-4800 of Hitachi, Ltd. was used. Results obtained herein are shown in FIG. 4.

Through FIG. 4, it was identified that in the separator of Preparation Example 2, the coating layer including molybdenum disulfide was uniformly formed on the substrate.

Experimental Example 4. Evaluation on Battery Performance

ED factor values of the lithium-sulfur secondary batteries according to Example 2 and Comparative Example 4 were measured using a charge and discharge measurement device (LAND CT-2001A, Wuhan, China) while conducting charge-discharge at current density of 0.1 C during initial cycles, and then conducting 0.1 C charge and 0.2 C discharge thereafter. Results obtained herein are shown in FIG. 5.

As shown in FIG. 5, it was seen that the ED factor value of the battery according to Example 2 was all excellent regardless of current density.

Specifically, it was identified that the lithium-sulfur secondary battery according to Example 2 using the separator including a molybdenum disulfide coating layer had a higher ED factor value compared to the lithium-sulfur secondary battery according to Comparative Example 4 that did not form a molybdenum disulfide coating layer. In addition, it was identified that, whereas the lithium-sulfur secondary battery according to Comparative Example 4 had a rapidly decreased ED factor value after 10 cycles, the lithium-sulfur secondary battery according to Example 2 had a stably maintained ED factor value up to 35 cycles. From such results, it was seen that the lithium-sulfur secondary battery of the present invention is capable of enhancing lifetime properties while stably accomplishing higher energy density that has not been able to obtain with existing lithium-sulfur secondary batteries.

The invention claimed is:

1. A lithium secondary battery comprising:
a positive electrode comprising a positive electrode active material layer;
a negative electrode;
a separator; and
an electrolyte liquid,
wherein the positive electrode has an SC factor value represented by the following Mathematical Formula 1 of 0.45 or greater and 4.5 or less:

$$SC \text{ factor} = \alpha \times \frac{L}{P} \quad \text{[Mathematical Formula 1]}$$

in Mathematical Formula 1,
P is a porosity (%) of the positive electrode active material layer;
L is a mass of sulfur per unit area (mg/cm$^2$) of the positive electrode active material layer; and
α is 10,
wherein the SC factor defines the relationship between α, P, and L;
the electrolyte liquid comprises a solvent and a lithium salt; and
the solvent comprises a first solvent having a DV$^2$ factor value represented by the following Mathematical Formula 2 of 0.1 or greater and 1.75 or less; and a second solvent that is a fluorinated ether-based solvent:

$$DV^2 \text{ factor} = \gamma \times \frac{\mu}{DV} \quad \text{[Mathematical Formula 2]}$$

in Mathematical Formula 2,
DV is a dipole moment per unit volume (D·mol/L);
μ is viscosity of the solvent (cP, 25° C.); and
γ is 100,
wherein the DV$^2$ factor defines the relationship between μ, γ, and DV;
wherein the positive electrode further comprises a sulfur-carbon composite comprising a surface-modified carbon material, and a content of carbon in the surface-modified carbon material is 98% by weight or greater;
wherein the surface-modified carbon material has a specific surface area of 280 m$^2$/g to 4500 m$^2$/g and a pore volume of 2.3 cm$^3$/g to 5 cm$^3$/g, and
wherein the separator comprises a porous substrate and a molybdenum disulfide coating layer at least one surface of the porous substrate.

2. The lithium secondary battery of claim 1, wherein the molybdenum disulfide coating layer has a thickness of 0.1 μm to 10 μm.

3. The lithium secondary battery of claim 1, wherein the molybdenum disulfide coating layer is disposed on a surface of the porous substrate facing the negative electrode.

4. The lithium secondary battery of claim 1, wherein the first solvent has a DV$^2$ factor value of 1.5 or less.

5. The lithium secondary battery of claim 1, which has an NS factor value represented by the following Mathematical Formula 3 of 3.5 or less:

$$NS \text{ factor} = \frac{DV^2 \text{ factor}}{SC \text{ factor}} \quad \text{[Mathematical Formula 3]}$$

in Mathematical Formula 3,
wherein the NS factor defines the relationship between the DV$^2$ factor and the SC factor;
the SC factor has the same value as defined in Mathematical Formula 1; and
the DV$^2$ factor has the same value as defined in Mathematical Formula 2.

6. The lithium secondary battery of claim 1, which has an ED factor value represented by the following Mathematical Formula 4 of 850 or greater:

$$ED \text{ factor} = V \times SC \text{ factor} \times \frac{C}{D} \quad \text{[Mathematical Formula 4]}$$

in Mathematical Formula 4,
V is a discharge nominal voltage (V) for Li/Li$^+$;
SC factor has the same value as defined in Mathematical Formula 1;
C is discharge capacity (mAh/g) when discharging the lithium secondary battery at a 0.1 C rate; and
D is density (g/cm$^3$) of the electrolyte liquid,
wherein the ED factor defines the relationship between V, SC factor, C and D.

7. The lithium secondary battery of claim 1, wherein the first solvent comprises one or more selected from the group consisting of propionitrile, dimethylacetamide, dimethylformamide, gamma-butyrolactone, triethylamine and 1-iodopropane.

8. The lithium secondary battery of claim 1, wherein the second solvent comprises one or more selected from the group consisting of 1H,1H,2'H,3H-decafluorodipropyl ether, difluoromethyl 2,2,2-trifluoroethyl ether, 1,2,2,2-tetrafluoroethyl trifluoromethyl ether, 1,1,2,3,3,3-hexafluoropropyl difluoromethyl ether, pentafluoroethyl 2,2,2-trifluoroethyl ether and 1H, 1H,2'H-perfluorodipropyl ether.

9. The lithium secondary battery of claim 1, wherein the first solvent is present in the solvent in an amount of 1% by weight to 50% by weight based on a total weight of the solvent.

10. The lithium secondary battery of claim 1, wherein the second solvent is present in the solvent in an amount of 50% by weight to 99% by weight based on a total weight of the solvent.

11. The lithium secondary battery of claim 1, wherein the first solvent and the second solvent are present in the solvent in a weight ratio of 1:1 to 1:9.

12. The lithium secondary battery of claim 1, wherein the surface-modified carbon material comprises a carbon material which has been heat treated to form a modified surface that is capable of uniformly supporting sulfur.

* * * * *